(12) United States Patent
James-Roxby et al.

(10) Patent No.: US 8,595,442 B1
(45) Date of Patent: Nov. 26, 2013

(54) REDUNDANTLY VALIDATING VALUES WITH A PROCESSOR AND A CHECK CIRCUIT

(75) Inventors: Philip B. James-Roxby, Longmont, CO (US); Austin H. Lesea, Los Gatos, CA (US)

(73) Assignee: XILINX, Inc., San Jose, CA (US)

( * ) Notice: Subject to any disclaimer, the term of this patent is extended or adjusted under 35 U.S.C. 154(b) by 479 days.

(21) Appl. No.: 12/947,363

(22) Filed: Nov. 16, 2010

(51) Int. Cl.
*G06F 12/16* (2006.01)
*G06F 11/00* (2006.01)

(52) U.S. Cl.
USPC ............... 711/131; 714/E11.001; 714/25

(58) Field of Classification Search
None
See application file for complete search history.

(56) References Cited

U.S. PATENT DOCUMENTS

2009/0187793 A1* 7/2009 Dohji et al. ............... 714/42
2009/0292977 A1* 11/2009 Bradley et al. ............ 714/807

OTHER PUBLICATIONS

Taylor, Brad et al., *28nm Generation Programmable Families*, Aug. 8, 2010, pp. 1-25, available from Xilinx, Inc., San Jose, California, USA.
IEC, *Functional safety of electrical/electronic/programmable electronic safety-related systems—Part 2: Requirements for electrical/electronic/programmable electronic safety-related systems*, originally published 2005, revised Apr. 30, 2010, pp. 1-93, International Electrotechnical Commission (IEC), Geneva, Switzerland.
Nass, Rich, "Xilinx puts ARM core into its FPGAs," *EE Times*, Apr. 27, 2010, pp. 1-2, www.eetimes.com.

* cited by examiner

*Primary Examiner* — Denise Tran
(74) *Attorney, Agent, or Firm* — LeRoy D. Maunu

(57) ABSTRACT

Methods and systems redundantly validate values that are stored in a memory arrangement. The memory arrangement includes a first port and a second port that provide coherent access to one or more caches in the memory arrangement, and the first and second ports provide this coherent access at the same priority level. An instruction processor verifies that a first expected value matches a first check value calculated from the values as read from the memory arrangement via the first port. A check circuit verifies that a second expected value matches a second check value calculated from the values as read from the memory arrangement via the second port. A recovery operation is performed in response to the first or second expected values not matching the first and second check values, respectively.

20 Claims, 3 Drawing Sheets

REDUNDANTLY VALIDATING VALUES WITH A PROCESSOR AND A CHECK CIRCUIT

FIELD OF THE INVENTION

One or more embodiments generally relate to safety-critical systems, and more particularly to validating that stored values are not corrupt.

BACKGROUND

Safety-critical systems require high reliability. Charge deposited by ions, either as the result of cosmic radiation, or from the unavoidable background contamination present in the materials used for construction of the integrated circuit, may corrupt values stored in memory. There is a general need to mitigate such "soft errors" in safety-critical systems.

One or more embodiments may address one or more of the above issues.

SUMMARY

In one embodiment, a method is provided for redundantly validating values that are stored in a memory arrangement. The memory arrangement includes first and second ports that provide coherent access to one or more caches in the memory arrangement, and the first and second ports provide this coherent access at the same priority level. An instruction processor verifies that a first expected value matches a first check value calculated from the values as read from the memory arrangement via the first port. A check circuit verifies that a second expected value matches a second check value calculated from the values as read from the memory arrangement via the second port. A recovery operation is performed in response to the first or second expected values not matching the first and second check values, respectively.

In another embodiment, a system is provided for redundantly validating values. The system includes a memory arrangement, an instruction processor, and a check circuit. The memory arrangement stores the values. The memory arrangement includes first and second ports that provide coherent access to one or more caches in the memory arrangement, and the first and second ports provide this coherent access at the same priority level. The instruction processor is coupled to the first port of the memory arrangement. The instruction processor is programmed to verify whether a first expected value matches a first check value calculated from the values as read from the memory arrangement via the first port. The instruction processor is further programmed to execute a recovery routine in response to the first expected value not matching the first check value. The check circuit is coupled to the second port of the memory arrangement. The check circuit verifies whether a second expected value matches a second check value calculated from the values as read from the memory arrangement via the second port. The instruction processor is programmed to execute the recovery routine in response to the second expected value not matching the second check value.

In yet another embodiment, another system is provided for redundantly validating values. The system includes a memory arrangement, a check circuit, and an instruction processor. The memory arrangement stores the values. The memory arrangement includes first and second ports that provide coherent access to one or more caches in the memory arrangement, and the first and second ports provide this coherent access at the same priority level. The check circuit is coupled to the second port of the memory arrangement. The check circuit verifies whether a first expected value matches a first check value calculated from the values as read from the memory arrangement via the first port. The check circuit invalidates the one or more caches of the memory arrangement in response to the first expected value not matching the first check value. The instruction processor is coupled to the second port of the memory arrangement. The instruction processor is programmed to verify whether a second expected value matches a second check value calculated from the values as read from the memory arrangement via the second port. The check circuit invalidates the one or more caches of the memory arrangement in response to the second expected value not matching the second check value.

It will be appreciated that various other embodiments are set forth in the Detailed Description and Claims, which follow.

BRIEF DESCRIPTION OF THE DRAWINGS

Various aspects and advantages will become apparent upon review of the following detailed description and upon reference to the drawings, in which.

DETAILED DESCRIPTION

Figure 1:
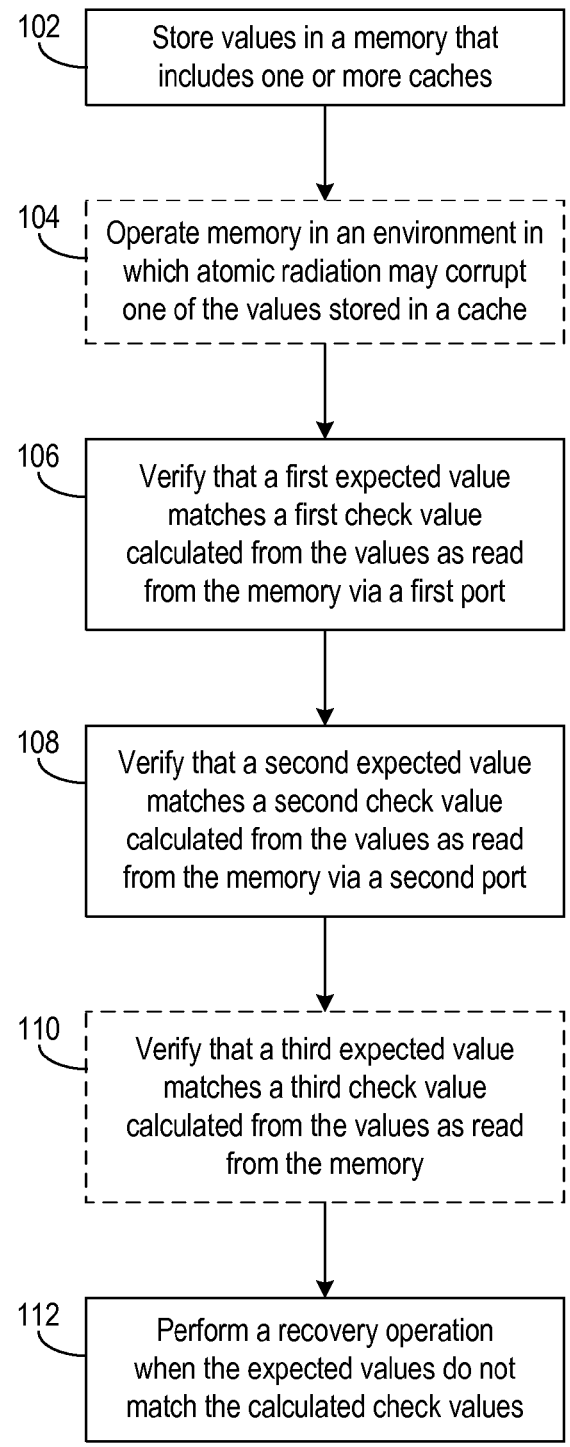
FIG. 1 is a flow diagram of a process for redundantly validating values.

FIG. 1 is a flow diagram of a process for redundantly validating values. To increase the reliability of validation, both an instruction processor and a check circuit verify the values.

At block 102, the values are stored in a memory arrangement. In one embodiment, the memory arrangement includes a main storage and one or more caches. For recently accessed values, the caches generally provide faster access than the main storage, but the main storage has more capacity than the caches. The memory arrangement has a first and second port and optionally more ports that provide coherent read and write access to the caches backed by the main storage. The ports provide the same priority level for this coherent access.

At optional block 104, the memory arrangement is operated in an environment in which atomic radiation may corrupt one of the values stored in a cache of the memory arrangement. The atomic radiation may be cosmic radiation from outer space, or a byproduct from radioactive decay of atoms in or near the memory arrangement, for example. The atomic radiation may create a trail of electron-hole pairs in a semiconductor of an integrated circuit in the cache, and a storage node of the cache may collect enough electrons or enough holes to alter the state of the storage node. This may corrupt a value stored in the cache. Another possible source of corruption is noise that causes the failure of a setup time for a cache register with a tight timing margin near the limits of operating temperature and power supply voltage.

At block 106, an instruction processor reads the values from the memory arrangement via the first port. The values that are stored in the caches are generally read from the caches and the values that are not stored in the caches are generally read from main storage. The instruction processor calculates a check value from the values as read from the memory arrangement via the first port. The instruction processor verifies that an expected value matches the check value.

At block 108, a check circuit verifies that another expected value matches another check value calculated from the values as read from the memory arrangement via the second port. High reliability is provided for safety-critical systems when the independent checks by the instruction processor at block 106 and the check circuit at block 108 both validate the values stored in the memory arrangement.

To obtain even higher reliability, a third check is optionally performed at block 110. The third check verifies that an expected value matches a check value calculated from the values as read from the memory arrangement. For this third check, the instruction processor verifies the values as read via the first port, or the check circuit verifies the values as read via the second port. Alternatively, another instruction processor or another check circuit performs the third check.

The redundant validation at block 106, block 108, and optional block 110 provides high reliability for safety-critical systems, because the values are validated using different techniques. The verification techniques of blocks 106 and 108 differ because the instruction processor executes instructions to verify the values and the check circuit does not execute any instructions to verify the values. The verification techniques of blocks 106, 108, and 110 can also differ, for example, because they respectively verify a checksum of the values, a cyclic redundancy check of the values, and a cryptographic hash of the values. While the individual checks of blocks 106, 108, and 110 might fail if the verification technique is faulty or if the corruption does not change the check value, the multiple independent checks of blocks 106, 108, and 110 are unlikely to all fail. In addition, calculating and verifying a cryptographic hash for the values helps protect against malicious corruption.

At block 112, a recovery operation is performed when the expected values do not match the respective check values of blocks 106, 108, and 110. The recovery operation corrects the corrupted value.

In one embodiment, one or more of the caches in the memory arrangement do not have an error detection circuit or an error correction circuit protecting each value that is stored in these caches. However, the main storage in the memory arrangement has an error detection and correction circuit that detects and corrects corruption of values stored in the main storage using an error correcting code for each word in the main storage. Thus, the cache itself does not detect and does not correct corruption of values stored in the cache, but the main storage does detect and correct corruption of values stored in main storage. The redundant validation of blocks 106, 108, and 110 detects corruption of one or more values stored in the caches, and the recovery operation of block 112 corrects any such detected corruption. For a value that is unmodified in a cache before corruption, the recovery operation of block 112 can correct the corruption by flushing or invalidating the corrupted value from the cache. After removing the corrupted value from the cache, the main storage provides the correct value. The main storage provides a correct value because the main storage has an error correcting circuit protecting each value stored in the main storage.

In one embodiment, the instruction processor executes a recovery routine to perform the recovery operation. During execution of the recovery routine, the instruction processor flushes all the protected values from each cache of the memory arrangement. In one example, the instruction processor executes a flush instruction for every cache line address of the protected values, and this operation flushes all the protected values from the caches, including flushing the corrupted value from the caches. In another example, the instruction processor executes a flush instruction to every cache line index of the caches, and this operation completely flushes the caches, including writing all the modified data in the caches into the main storage. In yet another example, the instruction processor executes purge instructions that invalidate the caches without writing any modified data back into the main storage. When the validated values do not exceed the capacity of the caches, the values may be explicitly flushed from the caches; otherwise, the caches may be completely flushed. The instruction processor issues a transaction to the first port for each flush or purge instruction executed. These transactions cause the caches of the memory arrangement to invalidate any corresponding cache lines currently stored in the caches.

The instruction processor executes the recovery routine regardless of whether the instruction processor or the check circuit detects corruption, in one embodiment. When the check circuit detects corruption because the expected value does not match the check value at block 108, the check circuit generates an interrupt signal, and the instruction processor executes the instructions of the recovery routine in response to the interrupt signal.

In another embodiment, the check circuit performs the recovery operation. The check circuit issues a sequence of flush or purge transactions to the second port to invalidate the values that are stored in the caches of the memory arrangement.

The validated values are certain instructions and/or input data for the instruction processor in one embodiment.

In one example, the instruction processor executes the instructions of a safety-critical application, and the safety-critical application batch processes sets of input data. During the batch processing of an input data set, the input data set and the instructions should not change. After generating an output data set from a particular input data set, the instruction processor generates a checkstop signal and validates the input data set and the instructions of the safety-critical application at block 106. In response to the checkstop signal, at block 108 the check circuit calculates a check value from the values as read from the memory arrangement via the second port, and the check circuit verifies that an expected value matches the check value. If both the instruction processor and the check circuit validate that the input data set and the instructions of the safety-critical application are unchanged, then the output data set is released for further processing. Otherwise, the corruption is corrected at block 112, and the batch processing is repeated for the input data set. It will be appreciated that the calculation of the output data set might include calculating one or more expected values for protecting the output data set in subsequent processing of the safety-critical application.

In another example, the instruction processor is programmed to repeatedly validate instructions and/or input data of a safety-critical application at block 106, and similarly the check circuit repeatedly validates the instructions and/or input data at block 108. If corruption is detected either by the instruction processor at block 106 or the check circuit at block 108, then the recovery operation at block 112 is a full reboot of the safety-critical system.

Figure 2:
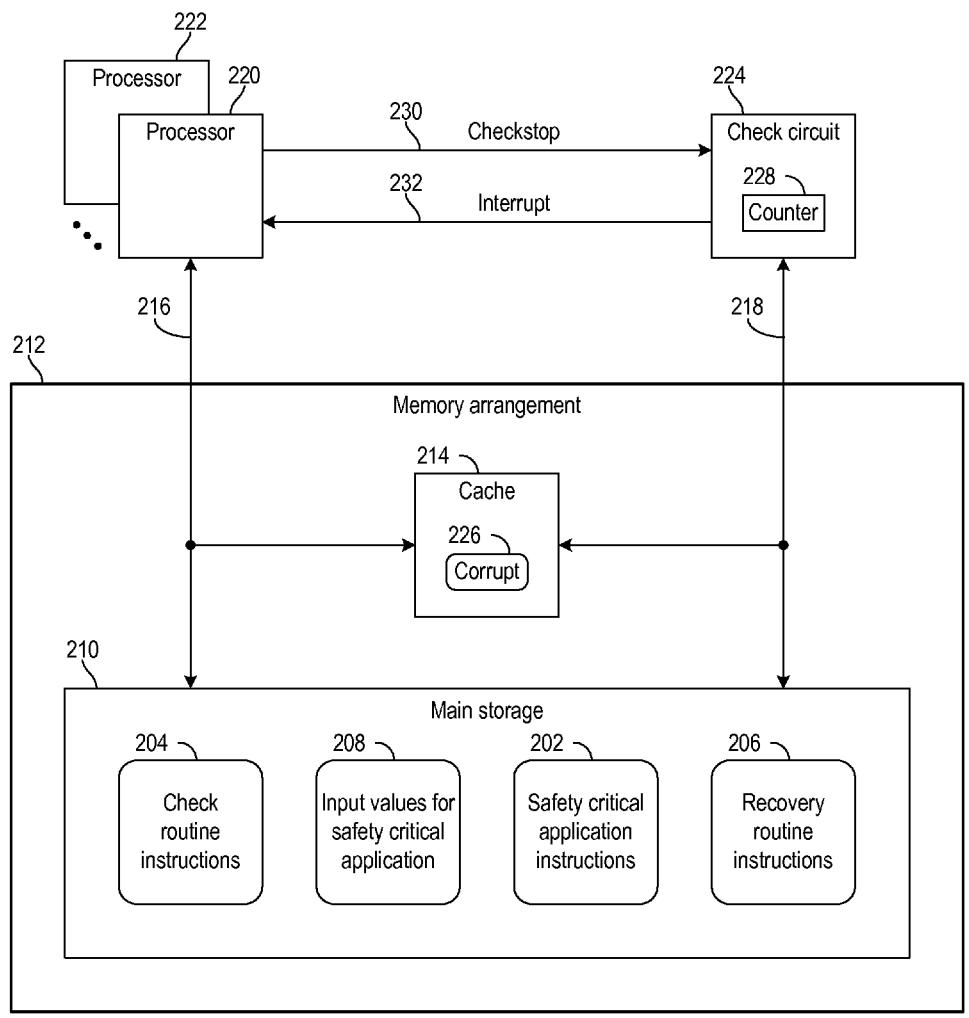
FIG. 2 is a block diagram of a system for redundantly validating values.

FIG. 2 is a block diagram of a system for redundantly validating values. In one embodiment, the values include the instructions 202 of a safety-critical application, the instructions 204 of a check routine, the instructions 206 of a recovery routine, and the input values 208 for the safety-critical application. The values of instructions 202, 204, and 206, and the input values 208 are stored in main storage 210 of a memory arrangement 212, and certain ones of these values are stored in a cache 214 of the memory arrangement 212. One or more embodiments validate that the instructions 202, 204, and 206, and the input values 208 are not corrupt.

The memory arrangement 212 has two ports on lines 216 and 218. The ports on lines 216 and 218 provide coherent access to the cache 214 and the main storage 210. To provide such coherent access, a cache coherency protocol orders the read and write accesses at the ports on lines 216 and 218. The values read from the memory arrangement are consistent with the ordering of the reads and writes, such that each read from an address generally returns the value from the immediately preceding write to the address in the ordering. In one embodiment, the memory arrangement 212 has more than one cache 214, and the cache coherency protocol also includes a protocol, such as a modified-exclusive-shared-invalid (MESI) protocol, for maintaining coherence between multiple caches. The value of a cache line in cache 214 with a modified state generally differs from the corresponding value in main storage 210. When a cache line in cache 214 is not in a modified state, the value of the cache line in cache 214 generally matches the corresponding value in main storage 210.

In one embodiment, the cache 214 does not include an error correction circuit protecting each value that is stored in cache 214. However, the main storage 210 does include an error correction circuit and hence can provide the correct value, unless the cache line including the corrupted value 226 is in the modified state.

The two ports on lines 216 and 218 provide coherent access at the same priority level. In one embodiment, access is provided in a round-robin order that equally divides access to the memory arrangement 212 among the ports on lines 216 and 218 that are currently requesting access to the memory arrangement 212. This approach ensures that the check circuit coupled to the port on line 218 continuously makes forward progress validating the values regardless of the behavior of the instruction processors 220 through 222 coupled to the port on line 216, and vice versa.

Instruction processor 220 is programmed to execute the instructions 204 of a check routine to verify whether an expected value matches a check value. Instruction processors 220 through 222 are coupled to the port on line 216 of the memory arrangement 212. In response to executing the instructions 204 of the check routine, the instruction processor 220 reads the values from the memory arrangement 212 via the port on line 216, calculates the first check value from the values as read from the memory arrangement 212 via the port on line 216, and verifies whether an expected value matches the check value.

Check circuit 224 verifies whether another expected value matches another check value calculated from the values as read from the memory arrangement 212 via the port on line 218. Check circuit 224 does not execute instructions. When a value 226 in cache 214 is corrupt, the instruction processor 220 and/or the check circuit 224 detect the corruption, because an expected value does not match its check value. In one embodiment, check circuit 224 includes a counter 228 that increments an index from a starting address of a range of the validated values to an ending address of the range. Check circuit 224 calculates its check value from each of the validated values as read from the memory arrangement 212 at the index corresponding to the validated values. The validated values include the instructions 202, 204, and 206, and the input values 208 in one embodiment.

Either the instruction processor 220 or the check circuit 224 performs a third validation, in one embodiment. Either the instruction processor 220 or the check circuit 224 verifies that a third expected value matches a third check value calculated from the values as read from the memory arrangement 212 via the appropriate port on line 216 or 218. To provide increased reliability, the third check value may be calculated differently from the other check value calculated by the instruction processor 220 or the check circuit 224.

In one embodiment, instruction processor 220 is programmed to execute the instructions 206 of a recovery routine in response to any expected value not matching its corresponding check value. The execution of the instructions 206 of the recovery routine causes instruction processor 220 to flush the values stored in cache 214, including flushing the corrupted value 226 from cache 214. After the instruction processor 220 flushes the corrupted value 226 from the cache 214 or the check circuit invalidates the corrupted value 226 in cache 214, the main storage 210 provides a correct value for the corrupted value from the instructions 202, 204, and 206, or the input values 208.

In another embodiment, the check circuit 224 invalidates the cache 214 of the memory arrangement 212 whenever any expected value does not match its check value.

The instruction processor 220 is programmed to generate a checkstop signal on line 230, in one embodiment. In response to the checkstop signal on line 230, the check circuit 224 calculates a check value from the values as read from the memory arrangement 212 via the port on line 218, and the check circuit 224 verifies that an expected value matches the second check value. The check circuit 224 generates an interrupt signal on line 232 when the expected value does not match the check value. The check circuit 224 might generate another interrupt signal when the values are successfully validated. The instruction processor 220 is programmed to execute the instructions 206 of the recovery routine in response to the interrupt signal on line 232.

Because the values of instructions 202, 204, and 206, and input values 208 are redundantly validated by instruction processor 220 and check circuit 224, the necessary reliability is provided for safety-critical systems despite cache 214 being unable to detect or correct a corrupted value 226. Whenever the instruction processor 220 or the check circuit 224 completes a repeated cycle of validating the values of instructions 202, 204, and 206, and input values 208, correct execution of the instructions 202 of the safety-critical application is ensured up to the beginning of the validation cycle. While corruption of one of the instructions 204 of the check routine could cause failure of a cycle of validation by instruction processor 220, the redundant validation of check circuit 224 should detect this corruption, because the check circuit 224 and the instruction processor 220 have symmetrical views of the memory arrangement 212. Corruption of value 226 in cache 214 can be corrected simply by flushing the corrupted value from cache 214, because the values of instructions 202, 204, and 206, and input values 208 do not normally become modified in cache 214. Thus, integrity is assured for the instructions 202 and the input values 208 read by the instruction processor 220 during execution of the instructions 202 of the safety-critical application.

In one embodiment, instruction processor 220 executes all the instructions 202, 204, and 206; and instruction processor 222 executes other instructions. In another embodiment, instruction processor 220 executes the instructions 202 of the safety-critical application and instruction processor 222 executes the validation instructions 204 and 206 of the check and recovery routines. In yet another embodiment, instruction processors 220 through 222 are a resource pool multiplexed to execute the tasks of the instructions 202, 204, and 206.

Figure 3:
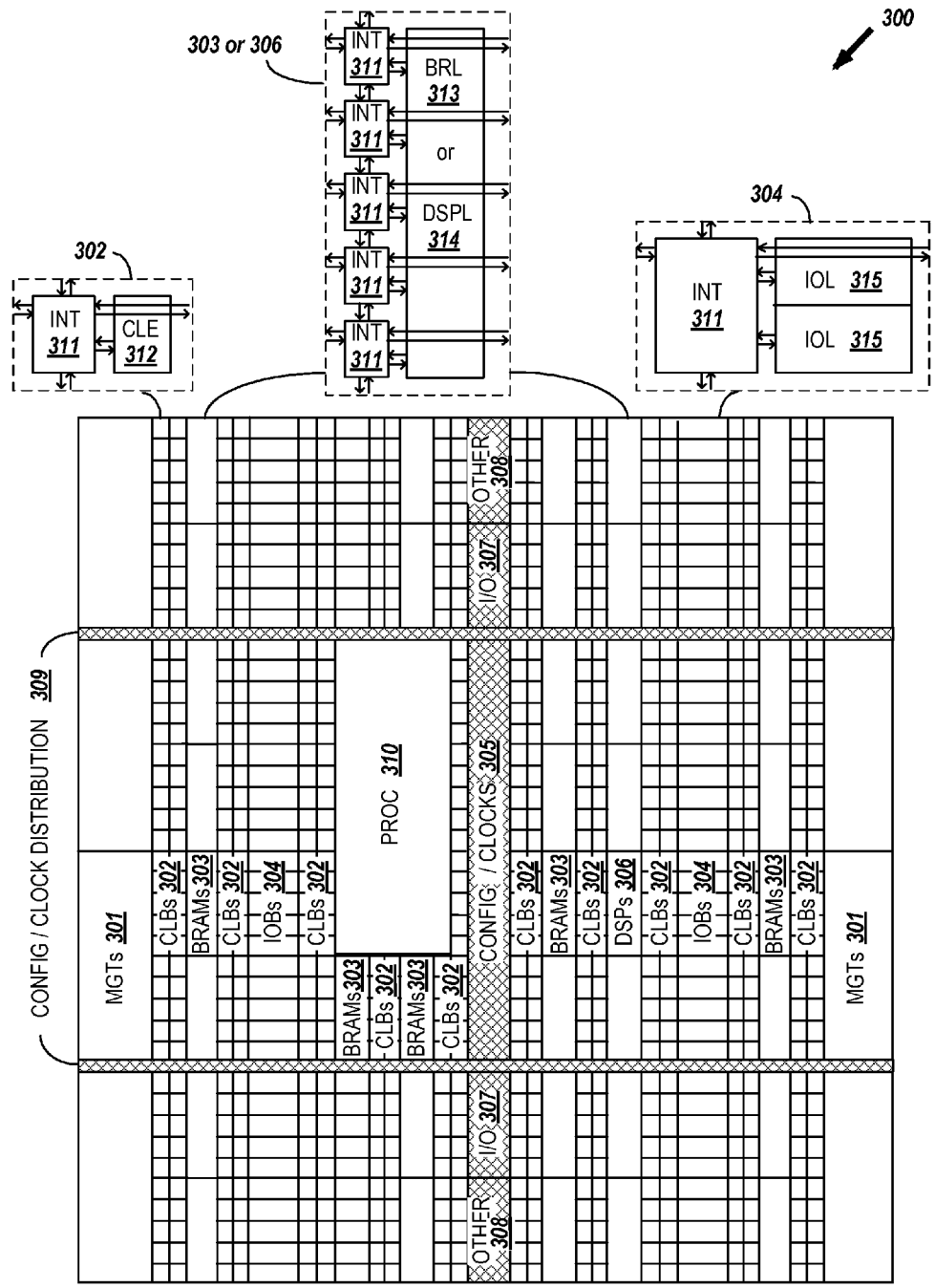
FIG. 3 is a block diagram of a programmable integrated circuit that is configurable to redundantly validate values.

FIG. 3 is a block diagram of a programmable integrated circuit (in this example a field programmable gate array, or FPGA) that is configurable to redundantly validate values. The programmable integrated circuit provides programmable resources that may be configured to implement a check circuit and optionally an instruction processor that each validates the values. Alternatively, the instruction processor block PROC 310 may validate the values instead of an instruction processor implemented in the programmable resources.

FPGAs can include several different types of programmable logic blocks in the array. For example, FIG. 3 illustrates an FPGA architecture (300) that includes a large number of different programmable resource tiles including multi-gigabit transceivers (MGTs 301), configurable logic blocks (CLBs 302), random access memory blocks (BRAMs 303), input/output blocks (IOBs 304), configuration and clocking logic (CONFIG/CLOCKS 305), digital signal processing blocks (DSPs 306), specialized input/output blocks (I/O 307), for example, e.g., clock ports, and other programmable logic 308 such as digital clock managers, analog to-digital converters, system monitoring logic, and so forth. Some FPGAs also include dedicated instruction processor blocks (PROC 310) and internal and external reconfiguration ports (not shown).

In some FPGAs, each programmable tile includes a programmable interconnect element (INT 311) having standardized connections to and from a corresponding interconnect element in each adjacent tile. Therefore, the programmable interconnect elements taken together implement the programmable interconnect structure for the illustrated FPGA. The programmable interconnect element INT 311 also includes the connections to and from the programmable logic element within the same tile, as shown by the examples included at the top of FIG. 3.

For example, a CLB 302 can include a configurable logic element CLE 312 that can be programmed to implement user logic plus a single programmable interconnect element INT 311. A BRAM 303 can include a BRAM logic element (BRL 313) in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 306 can include a DSP logic element (DSPL 314) in addition to an appropriate number of programmable interconnect elements. An 10B 304 can include, for example, two instances of an input/output logic element (IOL 315) in addition to one instance of the programmable interconnect element INT 311. As will be clear to those of skill in the art, the actual I/O pads connected, for example, to the I/O logic element 315 are manufactured using metal layered above the various illustrated logic blocks, and typically are not confined to the area of the input/output logic element 315.

In the pictured embodiment, a columnar area near the center of the die (shown shaded in FIG. 3) is used for configuration, clock, and other control logic. Horizontal areas 309 extending from this column are used to distribute the clocks and configuration signals across the breadth of the FPGA.

Some FPGAs utilizing the architecture illustrated in FIG. 3 include additional logic blocks that disrupt the regular columnar structure making up a large part of the FPGA. The additional logic blocks can be programmable blocks and/or dedicated logic. For example, the instruction processor block PROC 310 shown in FIG. 3 spans several columns of CLBs and BRAMs.

In one embodiment, the instruction processor block PROC 310 includes a cache. The instruction processor block PROC 310 provides two coherent access ports to the cache, one for the instruction processor block PROC 310 itself and another intended to support an instruction co-processor block that is implemented in the programmable resources. An example instruction processor block PROC 310 is an ARM Cortex processor system. The programmable resources implement a check circuit that does not execute instructions and the check circuit coherently accesses the cache via the co-processor port. The instruction processor block PROC 310 also provides a memory port for attaching a main storage. The main storage can be implemented using certain of the random access memory blocks BRAMs 303, or in a memory external to the FPGA architecture 300, for example. The programmable resources implement an error correction circuit protecting the values that are stored in main storage. The check circuit validates certain values stored in the cache and main storage and the instruction processor block PROC 310 is programmed to redundantly validate these values. When the instruction processor block PROC 310 or the check circuit detects corruption of the values, the cache is flushed or invalidated to remove the corrupted values from the cache.

Note that FIG. 3 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 3 are purely exemplary. For example, in an actual FPGA more than one adjacent column of CLBs is typically included wherever the CLBs appear, to facilitate the efficient implementation of user logic.

The embodiments of the present invention are thought to be applicable to a variety of methods and systems for validating stored values. Other aspects and embodiments will be apparent to those skilled in the art from consideration of the specification and practice disclosed herein. The embodiments may be implemented as one or more processors configured to execute software, as an application specific integrated circuit (ASIC), and/or as a logic on a programmable logic device. It is intended that the specification and illustrated embodiments be considered as examples only, with a true scope and spirit of the invention being indicated by the following claims.

What is claimed is:

1. A method of redundantly validating a plurality of values, comprising:
    storing the values in a memory arrangement;
    wherein the memory arrangement includes a first and a second port that provide coherent access to at least one cache in the memory arrangement, and the first and second ports provide the coherent access at a same priority level;
    verifying by an instruction processor that a first expected value matches a first check value calculated from the values as read from the memory arrangement via the first port;
    verifying by a check circuit that a second expected value matches a second check value calculated from the values as read from the memory arrangement via the second port; and
    performing a recovery operation in response to one of the first and second expected values not matching the first and second check values, respectively.

2. The method of claim 1, wherein the performing of the recovery operation includes flushing the values that are stored in the at least one cache of the memory arrangement by the instruction processor.

3. The method of claim 1, wherein the performing of the recovery operation includes invalidating the values that are stored in the at least one cache of the memory arrangement by the check circuit.

4. The method of claim 1, wherein in response to a corrupted one of the values that is stored in the at least one cache of the memory arrangement, the performing of the recovery operation includes flushing the values that are stored in the at least one cache of the memory arrangement, including flushing the corrupted one of the values from the at least one cache.

5. The method of claim 4, wherein the performing of the recovery operation further includes providing a correct value for the corrupted one of the values from a main storage of the memory arrangement.

6. The method of claim 1, wherein the storing of the values in a memory arrangement includes storing values that include a plurality of processor-executable instructions and a plurality of input values for the processor-executable instructions.

7. The method of claim 1, wherein the verifying by the instruction processor includes executing a plurality of instructions by the instruction processor, and the verifying by the check circuit includes not executing any instructions.

8. The method of claim 1, wherein:
the verifying by the check circuit includes generating an interrupt signal by the check circuit in response to the second expected value not matching the second check value; and
the performing of the recovery operation includes executing a plurality of instructions of a recovery routine by the instruction processor in response to the interrupt signal.

9. A system for redundantly validating a plurality of values, comprising:
a memory arrangement for storing the values;
wherein the memory arrangement includes a first and a second port that provide coherent access to at least one cache in the memory arrangement, and the first and second ports provide the coherent access at a same priority level;
an instruction processor coupled to the first port of the memory arrangement;
wherein the instruction processor is programmed to verify a first expected value matches a first check value calculated from the values as read from the memory arrangement via the first port, and the instruction processor is programmed to execute a recovery routine in response to the first expected value not matching the first check value; and
a check circuit coupled to the second port of the memory arrangement;
wherein the check circuit verifies that a second expected value matches a second check value calculated from the values as read from the memory arrangement via the second port, and
wherein the instruction processor is programmed to execute the recovery routine in response to the second expected value not matching the second check value.

10. The system of claim 9, wherein:
one of the first and second expected values does not respectively match the first and second check values in response to corruption of one of the values that is stored in the at least one cache in the memory arrangement; and
in response to executing the recovery routine, the instruction processor flushes the values that are stored in the at least one cache, including flushing the corrupted one of the values from the at least one cache.

11. The system of claim 10, wherein:
the memory arrangement further includes a main storage that provides a correct value for the corrupted one of the values after the instruction processor flushes the corrupted one of the values from the at least one cache; and
the at least one cache does not include an error correction circuit protecting each value that is stored in the at least one cache.

12. The system of claim 9, wherein the memory arrangement stores values that include a plurality of instructions executable by the instruction processor and a plurality of input values readable by the instruction processor responsive to the instruction processor executing the instructions.

13. The system of claim 9, wherein:
the memory arrangement includes a plurality of ports that include the first and second ports; and
the plurality of ports have the same priority level that equally divides access to the memory arrangement among the plurality of ports that are requesting access to the memory arrangement.

14. The system of claim 9, wherein:
the instruction processor is programmed to execute a plurality of instructions of a check routine and the recovery routine;
in response to executing the check routine, the instruction processor reads the values from the memory arrangement via the first port, calculates the first check value from the values as read from the memory arrangement via the first port, and verifies that the first expected value matches the first check value; and
the check circuit does not execute instructions.

15. The system of claim 9, wherein:
the check circuit includes a counter that increments an index from a starting address of a range of the values to an ending address of the range; and
the check circuit calculates the second check value from each of the values as read from the memory arrangement at the index corresponding to the value.

16. The system of claim 9, wherein:
the instruction processor is programmed to generate a checkstop signal; and
in response to the checkstop signal, the check circuit calculates the second check value from the values as read from the memory arrangement via the second port and verifies that the second expected value matches the second check value.

17. The system of claim 9, wherein:
the check circuit generates an interrupt signal in response to the second expected value not matching the second check value; and
the instruction processor is programmed to execute the recovery routine in response to the interrupt signal.

18. The system of claim 9, wherein the instruction processor is programmed to:
verify that a third expected value matches a third check value calculated from the values as read from the memory arrangement via the first port, the first and third check values being calculated differently, and
execute the recovery routine in response to the third expected value not matching the third check value.

19. The system of claim 9, wherein:
the check circuit verifies that a third expected value matches a third check value calculated from the values as read from the memory arrangement via the second port, the second and third check values being calculated differently; and the instruction processor is programmed to execute the recovery routine in response to the third expected value not matching the third check value.

20. A system for redundantly validating a plurality of values, comprising:
- a memory arrangement for storing the values
  wherein the memory arrangement includes a first and a second port that provide coherent access to at least one cache in the memory arrangement, and the first and second ports provide the coherent access at a same priority level;
- a check circuit coupled to the first port of the memory arrangement
  wherein the check circuit verifies that a first expected value matches a first check value calculated from the values as read from the memory arrangement via the first port, and the check circuit invalidates the at least one cache of the memory arrangement in response to the first expected value not matching the first check value; and
- an instruction processor coupled to the second port of the memory arrangement;
  wherein the instruction processor is programmed to verify a second expected value matches a second check value calculated from the values as read from the memory arrangement via the second port, and the check circuit invalidates the at least one cache of the memory arrangement in response to the second expected value not matching the second check value.

* * * * *